(12) United States Patent  
Klein et al.

(10) Patent No.: US 8,850,669 B1  
(45) Date of Patent: Oct. 7, 2014

(54) MOBILE CABLE HOLDER WITH LOCK

(75) Inventors: John Klein, Gilbert, AZ (US); Samuel Dumpe, Scottsdale, AZ (US); Aaron Moncur, Mesa, AZ (US)

(73) Assignee: Hubbell Incorporated, Shelton, CT (US)

( * ) Notice: Subject to any disclaimer, the term of this patent is extended or adjusted under 35 U.S.C. 154(b) by 436 days.

(21) Appl. No.: 13/348,524

(22) Filed: Jan. 11, 2012

Related U.S. Application Data

(63) Continuation-in-part of application No. 12/821,059, filed on Jun. 22, 2010, now Pat. No. 8,584,324.

(60) Provisional application No. 61/431,670, filed on Jan. 11, 2011, provisional application No. 61/219,258, filed on Jun. 22, 2009.

(51) Int. Cl.
  F16L 3/23 (2006.01)
  F16B 2/10 (2006.01)
  B65D 67/02 (2006.01)
  F16G 11/00 (2006.01)
  F16L 3/10 (2006.01)

(52) U.S. Cl.
  CPC .......... *F16L 3/1075* (2013.01); *F16L 3/23* (2013.01); *B65D 67/02* (2013.01); *F16L 3/1041* (2013.01)
  USPC ................. 24/134 R; 24/132 WL; 24/134 L; 24/16 R

(58) Field of Classification Search
  CPC ........................................ B65D 67/02
  USPC ......... 24/132 R, 134 L, 132 WL, 16 R, 17 A, 24/20 TT, 18, 17 AP, 599.8, 600.1; 70/16
  See application file for complete search history.

(56) References Cited

U.S. PATENT DOCUMENTS

| | | | |
|---|---|---|---|
| 1,014,118 A * | 1/1912 | Carberry | 70/16 |
| 1,806,163 A * | 5/1931 | Hoglund | 70/16 |
| 5,729,872 A * | 3/1998 | Ginocchio | 24/16 R |
| 6,101,684 A * | 8/2000 | Ginocchio | 24/16 R |
| 6,742,223 B1 * | 6/2004 | Chang | 24/16 R |
| 6,898,825 B1 * | 5/2005 | Charest | 24/16 R |
| 7,500,643 B2 * | 3/2009 | Leone et al. | 248/56 |
| 2010/0201144 A1 * | 8/2010 | Radle et al. | 294/166 |

* cited by examiner

*Primary Examiner* — Robert J Sandy
(74) *Attorney, Agent, or Firm* — Alfred N. Goodman; Mark S. Bicks

(57) ABSTRACT

A device holder includes a body having a receiving port and an arm having an engagement member. The engagement member has a plurality of teeth and is pivotally aligned with the receiving port. The device includes a button extending through a surface of the body pivotally coupled with a pawl positioned to releasably engage the teeth of the engagement member. A biasing member is located between an inner wall of the body and the pawl, biasing the pawl away from the inner wall. A lock located in the body and an actuator extending through a surface of the body is also included. The lock is positionable between a locked and an unlocked position.

20 Claims, 4 Drawing Sheets

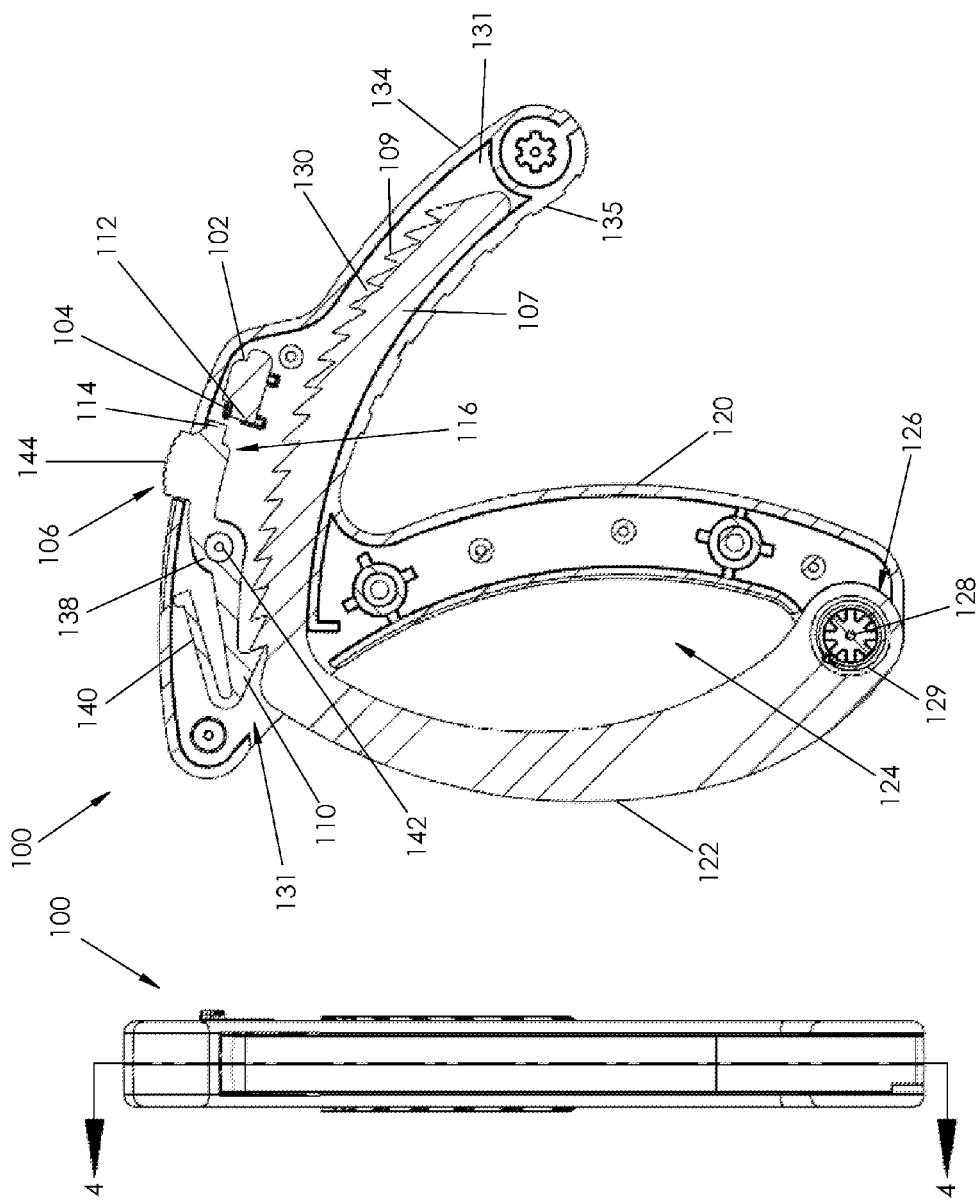

MOBILE CABLE HOLDER WITH LOCK

CROSS REFERENCE TO RELATED APPLICATIONS

This application is a continuation in part application of pending U.S. patent application Ser. No. 12/821,059 to Shotey et al. filed Jun. 22, 2010, now U.S. Pat. No. 8,584,324, and titled "Mobile Cable Holder", the disclosure of which is hereby incorporated herein entirely by this reference. This Application claims the benefit of the filing date of U.S. Provisional Patent Application 61/431,670 to Klein et al. entitled "Mobile Cable Holder with Lock" which was filed on Jan. 11, 2010, the disclosure of which is hereby incorporated herein by reference.

BACKGROUND

1. Technical Field

Aspects and implementations of the mobile cable holder relate to a mechanism and method for holding a cable, a hose, a wire, a flexible pipe, a rigid pipe, a rigid tube, a flexible tube, a rigid cylinder, a flexible cylinder, a chain, a cord, a rope, a coil, a line, a band, a lanyard, twine, a plurality of items, and/or the like.

2. Background Art

Cable holders and devices for bundling or storing items are well known. Traditional cable holders include a hand-cuff like element with jaws that are self-sustained in an open position while an item is bundled within the jaws. While jaws self-sustained in the open position ensure that the item can be located within the jaws, the user is required to manipulate the item and the jaws to encircle the item, thereby requiring a great deal of dexterity.

There are multiple variations of cable holders and devices known in the art including designs that use two separate jaws rotatably mounted together or a single piece unit that can flex to encircle the item. Nevertheless, cable holders require an inordinate amount of control to accomplish the goal of containing the item.

SUMMARY

This disclosure includes one or more device holder designs that permit the user to easily collect and store a variety of articles. A particular implementation employs a body and an arm capable of being locked together into a closed position.

A particular implementation broadly comprises a device holder including a body having a receiving port and an arm having an engagement member. The engagement member has a plurality of teeth and is pivotally aligned with the receiving port. A hinge rotatably connects the body and the arm. The device also includes a button extending through a surface of the body. The button is pivotally coupled with a pawl positioned to releasably engage the teeth of the engagement member when the arm is positioned within the receiving port. A biasing member is located between an inner wall of the body and the pawl, biasing the pawl away from the inner wall. A lock located in the body and an actuator extending through a surface of the body are also included. The lock is positionable between an unlocked position and a locked position through movement of the actuator, wherein in the locked position a portion of the lock is between a portion of the button and the engagement member.

In particular implementations, the holder may also include a handle extending from the body and surrounding the receiving port. The arm may be rigid or flexible.

In other implementations, the biasing member may be integral with the pawl and biases the pawl through flexure of a junction between the pawl and the biasing member. The button and the pawl may be integrally formed with the biasing member.

In another implementation, the body and the arm may define a receiving opening between the body and the arm sized to receive an article. The size of the receiving opening may be determined by the extent to which the engagement member extends into the receiving port.

In a particular implementation, the pawl may include an angled surface on a first side adapted to slide along and pass an angled surface on the plurality of teeth when the engagement member is inserted into the receiving port, and restrict movement of the engagement member by engaging a surface of a first tooth of the plurality of teeth when the engagement member is withdrawn from the receiving port unless the button is actuated.

Another implementation broadly comprises a device holder including a body having a receiving port and an arm pivotally coupled to the body and including an arm extension extending therefrom. The arm extension may include an engagement member having a plurality of teeth. The engagement member may be pivotally aligned with the receiving port. The device holder may also include a button extending through a surface of the body. The button may be pivotally coupled with a pawl positioned to releasably engage the teeth of the engagement member when the arm is positioned within the receiving port. A biasing member may be located between an inner wall of the body and the pawl, biasing the pawl away from the inner wall.

In another implementation, the holder may further include a lock located in the body. The lock may have an actuator extending through a surface of the body. The lock may be positionable between an unlocked position and a locked position through movement of the actuator, wherein in the locked position a portion of the lock is between a portion of the button and the engagement member.

A particular implementation may include the biasing member integral with the pawl and biases the pawl through flexure of a junction between the pawl and the biasing member. The button and the pawl may be integrally formed with the biasing member.

The pawl may include an angled surface on a first side adapted to slide along and pass an angled surface on the plurality of teeth when the engagement member is inserted into the receiving port, and restrict movement of the engagement member by engaging a surface of a first tooth of the plurality of teeth when the engagement member is withdrawn from the receiving port unless the button is actuated.

The lock and the button may operate independently. The movement of the actuator is in a first direction and the button when actuated moves in a second direction substantially perpendicular to the first direction.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special"

definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Detailed Description or Description of the Drawings or claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . ." or "step for performing the function of . . .," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Features of particular embodiments and implementations of device holders will hereinafter be described in conjunction with the appended drawings, where like designations denote like elements, and:

FIG. 3 is a front elevation view of a mobile cable holder with the lock in the unlocked position and the second jaw in the closed position;

FIG. 4 is a sectional view of the mobile cable holder in FIG. 3 taken generally about line A-A;

DETAILED DESCRIPTION

Figure 1:
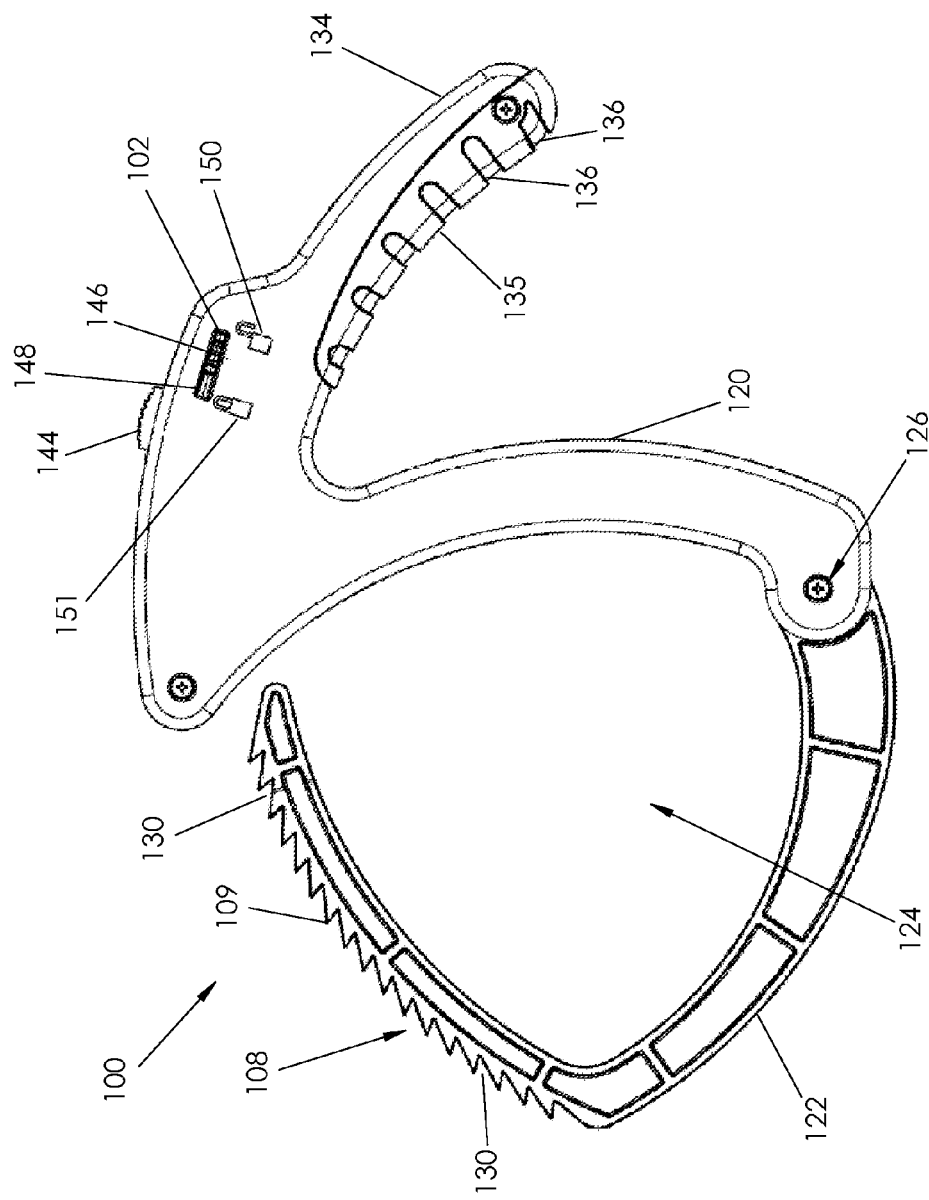
FIG. 1 is a right elevation view of a mobile cable holder with the lock in the unlocked position and a second jaw partially open.
Figure 2:
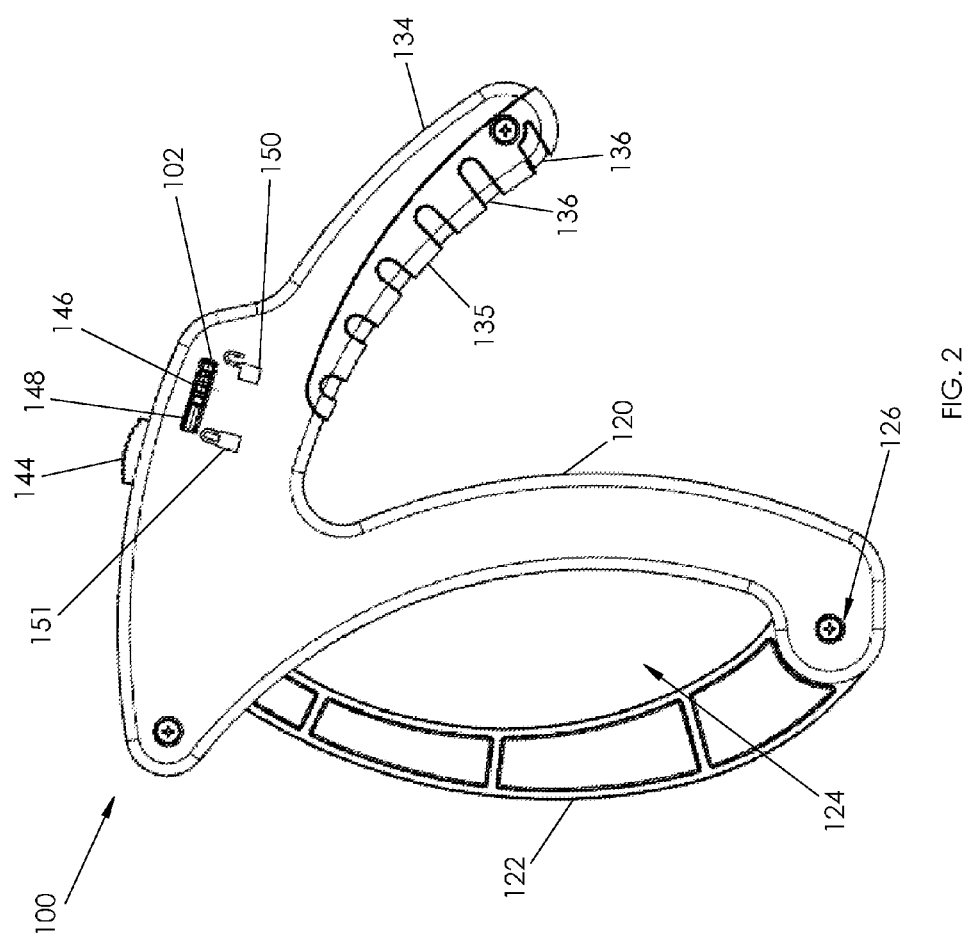
FIG. 2 is a right elevation view of a mobile cable holder with the lock in the unlocked position and a second jaw in the closed position.

FIGS. 1-6 illustrate an implementation of a mobile cable holder 100. FIG. 1 illustrates an implementation of the cable holder 100 in an open position with a locking mechanism 102 in an unlocked position. FIG. 2 illustrates the same cable holder 100 in a fully closed position with the locking mechanism 102 in the unlocked position.

FIGS. 3 and 4 illustrate the cable holder 100 in the closed position with the locking mechanism 102 in the unlocked position. As can be better seen, the locking mechanism 102 includes a stepped feature 104 and is movable towards and away from a release mechanism 106. The release mechanism 106 performs the actual release of an arm extension 107 comprising a curved ratchet rack 108 having a plurality of teeth 109 and a pawl or prong 110. The teeth 109 of the ratchet rack 108 are engaged by the pawl 110 to permit motion in one direction only, which retains the cable holder 100 in a closed position. As can be seen, the locking mechanism 102 operates independently of the release mechanism 106 and in a direction generally perpendicular as well.

Figures 5, 6:
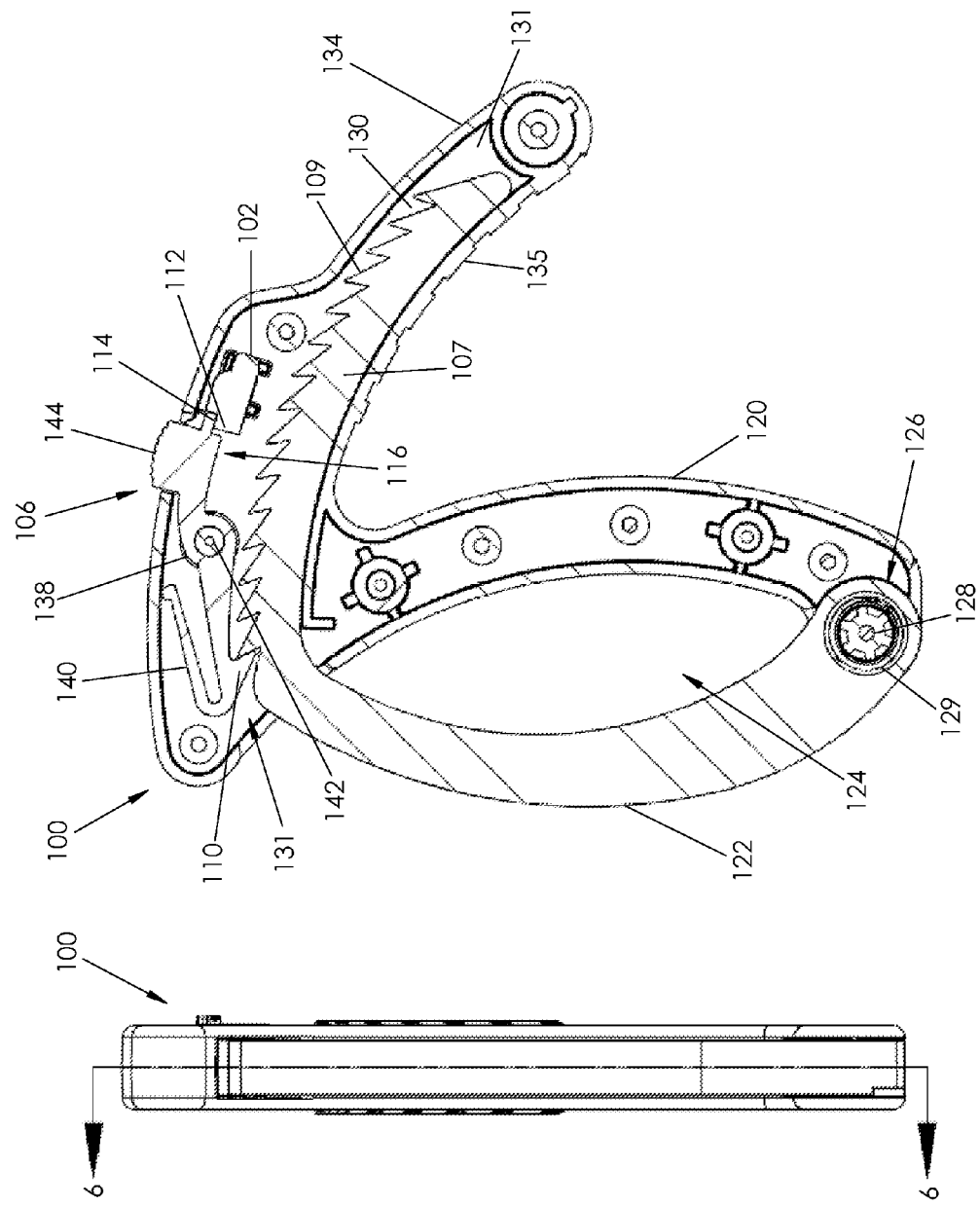
FIG. 5 is a front elevation view of a mobile cable holder with the lock in the locked position and the second jaw in the closed position; and, FIG. 6 is a sectional view of the mobile cable holder in FIG. 5 taken generally about line A-A.

Referring now to FIGS. 5 and 6, the cable holder 100 is shown in the closed position with the locking mechanism 102 in the locked position. Here, the stepped feature 104 includes a locking tab 112 that may be moved horizontally into position below a tab 114 on a back end 116 of the release mechanism 106. Advantageously, the locking tab 112 only moves in a horizontal direction so that downward movement of the release mechanism 106 while the locking mechanism 102 is engaged will not cause the locking mechanism 102 to become disconnected.

Accordingly, the locking mechanism 102 provides a safeguard to prevent accidental release of the cable holder release mechanism 106 that can easily and efficiently be operated with a user's thumb while holding the cable holder 100.

One particular implementation of a mobile cable holder 100 may comprise a body 120, an arm 122 including the curved ratchet rack 108 with the plurality of teeth 109, and a receiving opening 124, as particularly seen in FIGS. 1, 4 and 6. The arm 122 is configured such that it can be in an open position as seen in FIG. 1 or a closed open position in relation to the body 120 as seen in FIGS. 4 and 6. For instance when arm 122 is in a closed position, as in FIGS. 2, 4 and 6, arm 122 and body 120 together at least partially define the receiving opening 124. When arm 122 is in the closed position, it generally will not move into the open position without user intervention. The pawl 110 engages one of the teeth 109 of the ratchet rack 108 to hold the arm 122 in the closed position. The arm 122 can be in an open position as well, as shown in FIG. 1. This is useful in that the arm may be placed in the open position in order to put the mobile cable holder 100 around a loop of cable, and then the arm 122 may be placed in the closed position (placing the cable within the receiving opening 124) to allow for easy carrying, holding, and storage of the cable.

Any mechanism or device can be used to allow arm 122 to move in an open and closed position in relation to the body 120. In the embodiment represented in FIGS. 1-3, mobile cable holder 100 further comprises a hinge 126 which allows the arm 122 to swing into an open position and swing back into a closed position. Hinge 126 may include a male hinge element 128, located on body 10, and a female hinge element 129, located on arm 122. When engaged together, male hinge element 128 and female hinge element 129 allow the arm 122 to rotate about an axis (perpendicular to the page) between an open and a closed position.

The arm 122 may further comprise the ratchet rack 108. The ratchet rack 108 may have teeth 109. The teeth 109 may have notches 130 formed therein that may work in conjunction with several other elements to perform a variety of functions. For instance, the mobile cable holder 100 may further comprise an arm extension retainer or receiving port 131. The pawl 110 is located inside the receiving port 131. The mobile cable holder 100 may be configured such that arm extension 107 may extend various depths into the receiving port 131 and may be held at various depths by the pawl 110 being lodged into one of notches 130 of the teeth 109 on the ratchet rack 108.

The mobile cable holder 100 comprises the plurality of notches 130 and teeth 109 in the ratchet rack 108 of the arm extension 107. Providing the plurality of notches 130 to engage with the pawl 110 at various locations on the arm extension 106 allows the arm extension 106 to be secured at various fixed positions within the arm extension retainer 131, thereby allowing the size of receiving opening 124 to vary in different closed positions. This may allow a user to secure the mobile cable holder 100 snug around various amounts and sizes of cable or other items. For instance, for a small amount or size of cable, a smaller receiving opening may be desired to hold the cable snugly or allow less movement of the cable in the mobile cable holder 100. Nevertheless, if the user wants to permit movement of the cable within the mobile cable holder 100, he could alter the size of the receiving opening 124 accordingly. For larger cable sizes or larger amounts of cable, the user may need to use a larger receiving opening in order to enclose the loop of cable. The user could then alter the depth of arm extension 107 within the arm extension retainer 131 to alter the size of receiving opening 124 accordingly.

These various elements and any others could be configured such that the receiving opening 124 can be opened along a continuum of different sizes from a fully closed to a fully open position or such that receiving opening 124 only varies along a limited number of discrete positions. As can be envisioned from FIG. 4, these various elements may also be configured such that once the pawl 110 is lodged within notch 130, the arm 122 may be pushed into a more closed position and the movement of arm extension 107 alone will cause the pawl 110 to exit the notch it is in and then fall in the next notch, and so forth, while at the same time preventing movement of the arm 122 towards the open position without a manual release of the pawl 110 from the particular notch 130 due to the ramp-like configuration of the notches 130 in this particular embodiment. FIG. 4 shows the cable holder 100 in the fully closed position in which may be accomplished by pushing the arm extension 107 all the way into the arm extension retainer 131 so that the arm extension 107 is fully enclosed within the arm extension retainer 131.

The mobile cable holder 100 may further comprise a handle 134 as seen in FIGS. 1, 2, 4 and 6 which may fulfill a variety of functions. For instance, handle 134 may be useful to more easily grip the mobile cable holder 100. The handle 134 may also serve other functions, such as allowing the user to simultaneously hold the cable holder 100 and manipulate the locking mechanism 102 as seen in FIG. 1. In an implementation shown in FIG. 1, the handle 134 further comprises a gripping region 135 including a plurality of grooves 136 formed in the gripping region 135 to provide better physical grip for the user. The gripping region 135 may be integrally formed in the handle 134 or may be a separate part attached to the handle 134. The gripping region 134 may also be made from a different material than the material used for the handle 134. The gripping region 135 may be a cushioned or softer material that provides a better surface to grip for the user.

Further, the mobile cable holder 100 comprises the release mechanism 106 that may further comprise a lever 138 pivotably mounted to the body 120 which may tend to keep the pawl 110 lodged in notch 130. Lever 138 may be configured to create enough downward pressure into the notch 130 such that once pawl 110 is within a notch 130, the pawl 110 will not move out of that notch 130 without user intervention. The lever 138 may include a biasing mechanism 140. Further, the lever 138 may at least partially occupy a portion of receiving port 131. The release mechanism 106 also comprises a pivot 142 and a button 144 that partially protrudes through the body 120 to allow user access to operate the release mechanism 106. During operation of the cable holder 100, the user presses downwardly on the button 144 to cause the release mechanism 106 to pivot about the pivot 142 thereby raising and disengaging the pawl 110 from a notch 130 in the arm extension 107. The arm extension 107 is then free and clear of the pawl 110 and may be removed from the extension retainer 131.

The biasing mechanism 140 may be used to bias the lever 138 in the closed position such that it would require user intervention to dislodge the pawl 110 from a notch 130. This biasing mechanism 140 may be a torsion spring or anything else that could be used to bias the lever 138 closed. The lever 138 may be configured to have enough downward pressure to force the pawl 110 into the notch 130 such that once the pawl 110 is in a notch 130 it will not move out of that notch 130 without user intervention such as by pulling on a finger grip, releasing the lever 138, or otherwise removing the pawl 110 from the notch 130.

As can be seen in the FIGs., the locking mechanism 102 operates independently of the release mechanism 106 and in a direction generally perpendicular as well. Referring now to FIGS. 1, 4 and 6, the cable holder 100 is shown in the closed position with the locking mechanism 102 in the unlocked position in FIG. 4 and with the locking mechanism 102 in the locked position in FIG. 6. Here, the stepped feature 104 includes the locking tab 112 that may be moved horizontally into position below the tab 114 on the back end 116 of the release mechanism 106. The locking mechanism 102 comprises an actuator 146 that extends through a slot 148 in the body 120 to allow user access to operate the locking mechanism 102. Advantageously, the locking tab 112 only moves in a horizontal direction so that downward movement of the release mechanism 106 while the locking mechanism 102 is engaged will not cause the locking mechanism 102 to become disconnected. During operation of the locking mechanism 102 of the cable holder 100, the user moves the actuator 146 horizontally in the slot 148 from an unlocked setting 150 to a locked setting 151. In an implementation, these settings 150, 151 are shown with icons or other labels on the body 120 (see FIG. 1 and FIG. 2). Once the locking mechanism 102 is engaged as shown in FIG. 6, the release mechanism 106 is no longer able to pivot about the pivot 142. Consequently, the pawl 110 remains engaged with a notch 130 and the arm extension 107 cannot move.

Accordingly, the locking mechanism 102 provides a safeguard to prevent accidental release of the cable holder release mechanism 106. As discussed above, the locking mechanism 102 can easily and efficiently be operated with a user's thumb while holding the cable holder 100.

In these and in any other embodiments, the mobile cable holder may be made of any materials and fabricated and/or assembled in any manner. For instance the mobile cable holder may be manufactured from various different pieces and then screwed or glued together. In one embodiment for instance the body is molded of two pieces of plastic which are then ultrasonic welded together. The various elements, such as a lever, a body, a hand grip, a pawl, and so forth, may be manufactured as one piece or may be manufactured as separate pieces to be joined together.

Still further, the arm 122 may be composed of any suitable material depending on the desired property of the arm. If a rigid arm is desired, a harder and more impact resistant material will preferably be utilized, while a softer and more flexible material will be used if a flexible arm is desired. Also, the arm 122 may be manufactured from two different materials if a user wants a flexible arm 122 with a rigid arm extension 107.

One advantage of the flexible arm is that it may allow a user to carry objects of various sizes and shapes. For instance, the flexibility of the flexible arm may allow the flexible arm to conform to the shape of an object in order to allow the object to be more firmly held within the receiving opening than with a rigid arm. In this way, an implementation with a flexible arm may allow objects to be carried that would not be able to be carried by an implementation with a rigid arm. For instance, rigid objects with obscure cross-sections may be difficult to secure within receiving opening 14. Using the implementation with a flexible arm, this problem may be eliminated as the flexible arm effectively allows the receiving opening to change shape.

It will be understood that implementations are not limited to the specific components disclosed herein, as virtually any components consistent with the intended operation of a method and/or system implementation for a mobile cable holder may be utilized. Accordingly, for example, although particular bodies, arms, springs, and other components are disclosed, such components may comprise any shape, size, style, type, model, version, class, grade, measurement, concentration, material, weight, quantity, and/or the like consistent with the intended operation of a method and/or system implementation for a mobile cable holder. Implementations are not limited to uses of any specific components, provided that the components selected are consistent with the intended operation of a method and/or system implementation for a mobile cable holder.

Accordingly, the components defining any mobile cable holder implementation may be formed of any of many different types of materials or combinations thereof that can readily be formed into shaped objects provided that the components selected are consistent with the intended operation of a mobile cable holder implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any mobile cable holder implementation may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld (e.g. an ultrasonic weld), a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The implementations listed here, and many others, will become readily apparent from this disclosure. From this, those of ordinary skill in the art will readily understand the versatility with which this disclosure may be applied.

The invention claimed is:

1. A device holder comprising:
    a body having a receiving port;
    an arm having an engagement member comprising a plurality of teeth, the engagement member pivotally aligned with the receiving port;
    a hinge rotatably connecting the body and the arm;
    a button extending through a surface of the body, the button pivotally coupled with a pawl positioned to releasably engage the teeth of the engagement member when the arm is positioned within the receiving port;
    a biasing member between an inner wall of the body and the pawl, biasing the pawl away from the inner wall; and
    a lock located in the body and an actuator extending through a surface of the body, the lock positionable between an unlocked position and a locked position through movement of the actuator, wherein in the locked position a portion of the lock is between a portion of the button and the engagement member.

2. The holder of claim 1 further comprising a handle extending from the body and surrounding the receiving port.

3. The holder of claim 1 wherein the biasing member is integral with the pawl and biases the pawl through flexure of a junction between the pawl and the biasing member.

4. The holder of claim 3 wherein the button and the pawl are integrally formed with the biasing member.

5. The holder of claim 1 wherein the body and the arm define a receiving opening between the body and the arm sized to receive an article.

6. The holder of claim 5 wherein a size of the receiving opening is determined by the extent to which the engagement member extends into the receiving port.

7. The holder of claim 1 wherein the pawl comprises an angled surface on a first side adapted to slide along and pass an angled surface on the plurality of teeth when the engagement member is inserted into the receiving port, and restrict movement of the engagement member by engaging a surface of a first tooth of the plurality of teeth when the engagement member is withdrawn from the receiving port unless the button is actuated.

8. The holder of claim 1 wherein the arm is rigid.

9. The holder of claim 1 wherein the arm is flexible.

10. The holder of claim 1 wherein the lock and the button operate independently.

11. A device holder comprising:

a body having a receiving port;

an arm pivotally coupled to the body and comprising an arm extension extending therefrom, the arm extension comprising an engagement member comprising a plurality of teeth, the engagement member pivotally aligned with the receiving port;

a button extending through a surface of the body, the button pivotally coupled with a pawl positioned to releasably engage the teeth of the engagement member when the arm is positioned within the receiving port; and a biasing member between an inner wall of the body and the pawl, biasing the pawl away from the inner wall.

12. The holder of claim 11 further comprising a lock located in the body, the lock comprising an actuator extending through a surface of the body, the lock positionable between an unlocked position and a locked position through movement of the actuator, wherein in the locked position a portion of the lock is between a portion of the button and the engagement member.

13. The holder of claim 12 wherein the lock and the button operate independently.

14. The holder of claim 12 wherein the movement of the actuator is in a first direction and movement of the button when actuated is in a second direction perpendicular to the first direction.

15. The holder of claim 11 further comprising a handle extending from the body and surrounding the receiving port.

16. The holder of claim 11 wherein the biasing member is integral with the pawl and biases the pawl through flexure of a junction between the pawl and the biasing member.

17. The holder of claim 16 wherein the button and the pawl are integrally formed with the biasing member.

18. The holder of claim 11 wherein the pawl comprises an angled surface on a first side adapted to slide along and pass an angled surface on the plurality of teeth when the engagement member is inserted into the receiving port, and restrict movement of the engagement member by engaging a surface of a first tooth of the plurality of teeth when the engagement member is withdrawn from the receiving port unless the button is actuated.

19. The holder of claim 11 wherein the arm is rigid.

20. The holder of claim 11 wherein the arm is flexible.

* * * * *